(12) United States Patent
Wollard, Jr.

(10) Patent No.: US 12,742,467 B2
(45) Date of Patent: Sep. 22, 2026

(54) MULTI-PIECE FASTENERS AND METHODS OF FASTENING

(71) Applicant: HOWMET AEROSPACE INC., Pittsburgh, PA (US)

(72) Inventor: James L. Wollard, Jr., Waco, TX (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 0 days.

(21) Appl. No.: 18/703,656

(22) PCT Filed: Nov. 28, 2022

(86) PCT No.: PCT/US2022/080496

§ 371 (c)(1),
(2) Date: Apr. 22, 2024

(87) PCT Pub. No.: WO2023/102348

PCT Pub. Date: Jun. 8, 2023

(65) Prior Publication Data

US 2024/0418197 A1 Dec. 19, 2024

Related U.S. Application Data

(60) Provisional application No. 63/264,667, filed on Nov. 30, 2021.

(51) Int. Cl.
*F16B 19/05* (2006.01)

(52) U.S. Cl.
CPC .......... *F16B 19/05* (2013.01); *F16B 2200/95* (2023.08)

(58) Field of Classification Search
CPC ............................ F16B 19/05; F16B 2200/95
See application file for complete search history.

(56) References Cited

U.S. PATENT DOCUMENTS

2004/0247835 A1* 12/2004 Keener ..................... C22F 1/10 427/457
2008/0152927 A1* 6/2008 Noguchi ............... C08F 255/02 525/76

(Continued)

FOREIGN PATENT DOCUMENTS

CA 3176717 A1 10/2020
DE 10254545 A1 6/2024

(Continued)

OTHER PUBLICATIONS

FacFox Docs, Black Coating Comparison: E-Coating vs. Powder Coating vs. Black oxide vs. Anodic oxidation vs. Black Zinc Plating , available at https://facfox.com/docs/kb/black-coating-comparison-e-coating-vs-powder-coating-vs-black-oxide-vs-anodic-oxidation-vs-black-zinc-plating (Year: 2019).*

(Continued)

*Primary Examiner* — Kyle A Cook
(74) *Attorney, Agent, or Firm* — K&L Gates LLP

(57) ABSTRACT

Multi-piece fasteners and methods of fastening are provided. The multi-piece fastener comprises a fastening collar and a pin. The fastening collar comprises an inner collar surface defining a collar cavity, an outer collar surface, a coating on the outer collar surface, and a lubrication layer intermediate the coating and the outer collar surface. The coating comprises a resin and a metal pigment. The pin is configured to be at least partially received by the collar cavity. The pin comprises a first pin end, a second pin end, and a shank extending intermediate the first pin end and the second pin end. The fastening collar is configured to be deformed onto the shank by forcibly contacting the outer collar surface of the fastening collar. Forcibly contacting the outer collar surface at least partially removes the coating on the outer (Continued)

collar surface and indicates installation of the multi-piece fastener.

19 Claims, 4 Drawing Sheets

(56) References Cited

U.S. PATENT DOCUMENTS

2013/0202382 A1 8/2013 Corbett
2014/0056663 A1 2/2014 Fukumoto
2015/0337885 A1* 11/2015 Whitlock .............. F16B 35/048 29/458
2016/0083109 A1* 3/2016 Regnard ............. F16B 25/0021 427/299
2016/0319211 A1* 11/2016 Barth ................. C10M 169/047
2017/0298970 A1* 10/2017 Bourges .................. F16B 4/004
2021/0054864 A1* 2/2021 Simpson ............. F16B 19/1063
2022/0196045 A1* 6/2022 Starbuck ................. F16B 31/02

FOREIGN PATENT DOCUMENTS

JP 2003-120641 A 4/2003
JP 2011-1536 A 1/2011
JP 2013-50214 A 3/2013
KR 10-2011-0029669 A 3/2011
WO 2020-208215 A1 10/2020
WO 2021-091553 A1 5/2021

OTHER PUBLICATIONS

International Search Report and Written Opinion of the International Searching Authority for International Application No. PCT/US2022/080496 mailed Mar. 23, 2023.

* cited by examiner

MULTI-PIECE FASTENERS AND METHODS OF FASTENING

CROSS REFERENCE TO RELATED APPLICATIONS

This application claims priority to U.S. Provisional Patent Application No. 63/264,667, which was filed on Nov. 30, 2021. The contents of which is hereby incorporated by reference into this specification.

FIELD OF USE

The present disclosure relates to multi-piece fasteners and methods of fastening.

BACKGROUND

Vehicle frames, storage racks, solar panel sub-structures, aircraft parts, and other structures can include numerous mechanical fasteners. For example, a structural fastener can be installed in a bore of a structural component to secure parts together. Properly installing a structural fastener into a bore presents challenges.

SUMMARY

According to one non-limiting aspect of the present disclosure, a multi-piece fastener is provided. The multi-piece fastener comprises a fastening collar and a pin. The fastening collar comprises an inner collar surface defining a collar cavity, an outer collar surface, a coating on the outer collar surface, and a lubrication layer intermediate the coating and the outer collar surface. In certain non-limiting embodiments, the fastening collar further comprises a corrosion resistance layer intermediate the coating and the outer collar surface. The coating comprises a film-forming resin and a metal pigment. The pin is configured to be at least partially received by the collar cavity. The pin comprises a first pin end, a second pin end, and a shank extending intermediate the first pin end and the second pin end. In various non-limiting embodiments, the shank comprises at least one of a generally smooth region, an annular shoulder, a groove, and a threaded region. In certain non-limiting embodiments, a diameter of the shank is in a range of 0.06 inch to 4 inches. The fastening collar is configured to be deformed onto the shank by forcibly contacting the outer collar surface of the fastening collar. Forcibly contacting the outer collar surface at least partially removes the coating on the outer collar surface and indicates installation of the multi-piece fastener. In certain non-limiting embodiments, the coating does not increase a coefficient of friction of the outer collar surface of the fastening collar.

In various non-limiting embodiments of the multi-piece fastener according to the present disclosure, the coating further comprises one or both of a fluorescent dye and a fluorescent pigment. In certain non-limiting embodiments, the metal pigment comprises aluminum, an aluminum alloy, or a combination thereof. In certain non-limiting embodiments, the coating comprises no greater than 0.01% by weight titanium dioxide based on total weight of the coating and/or no greater than 0.01% by weight metal oxide based on total weight of the coating. In various non-limiting embodiments, a CIELAB L* value of at least a region of the outer collar surface of the fastening collar of the multi-piece fastener is no greater than 10, as measured with an integrating sphere spectrophotometer with D65 Illumination, 10° observer, and specular component excluded.

In various non-limiting embodiments of the multi-piece fastener according to the present disclosure, the fastening collar further comprises a flange and the coating is not present on the flange. In certain non-limiting embodiments, the coating is in the shape of a strip and/or has an opacity of at least 25%.

In various non-limiting embodiments of the multi-piece fastener according to the present disclosure, the multi-piece fastener is configured to be installed in a bore in a structure, wherein the structure is at least one of an aerospace part or component, an automotive part or component, a transportation part or component, and a building and construction part or component. In certain non-limiting embodiments, the multi-piece fastener comprises at least one of a metal and a metal alloy. In various non-limiting embodiments, a lockbolt is provided comprising a multi-piece fastener according to the present disclosure.

According to another non-limiting aspect of the present disclosure, a method for fastening is provided. The multi-piece fastener, for example, may have a construction according to the present disclosure. In various embodiments of the method according to the present disclosure, the multi-piece fastener comprises a fastening collar and a pin. In certain embodiments, the fastening collar may comprise an inner collar surface defining a collar cavity, an outer collar surface, a coating on the outer collar surface, and a lubrication layer intermediate the coating and the outer collar surface. The coating comprises a resin and a metal pigment. The pin comprises a first pin end, a second pin end, and a shank extending intermediate the first pin end and the second pin end, and is configured to be at least partially received by the collar cavity. The method comprises inserting the pin at least partially into the collar cavity and forcibly contacting the outer collar surface of the fastening collar with an anvil of a fastening collar installation apparatus. The fastening collar is thereby deformed onto the shank of the pin. Forcibly contacting the outer collar surface at least partially removes the coating on the outer collar surface and indicates installation of the multi-piece fastener, such that, for example, at least 90% of a total visible surface area of the coating is removed from the outer collar surface of the fastening collar.

It will be understood that the invention disclosed and described in this specification is not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

Features and advantages of the non-limiting examples presented herein and the manner of attaining them will become more apparent, and the examples will be better understood, by reference to the following description taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Figure 1:
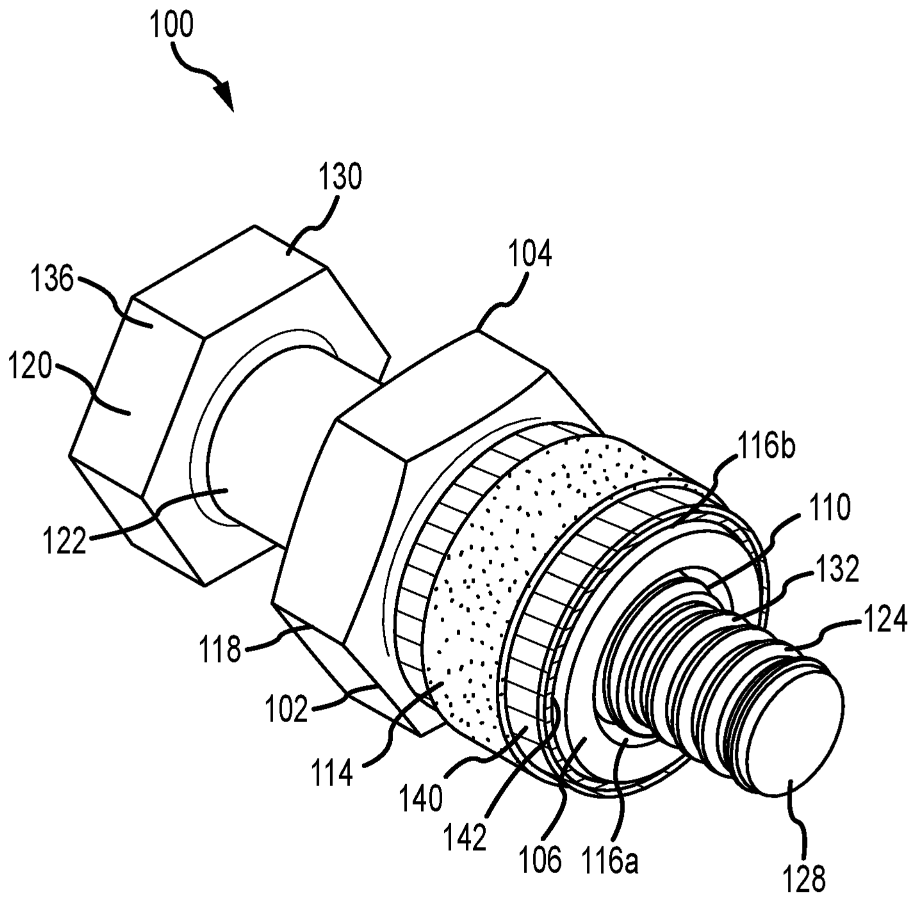
FIG. 1 is a perspective view of a non-limiting embodiment of a multi-piece fastener according to the present disclosure.

Various examples are described and illustrated herein to provide an overall understanding of the structure, function, and use of the disclosed fastening collars, multi-piece fastening systems, and methods of fastening. The various examples described and illustrated herein are non-limiting and non-exhaustive. Thus, the invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various embodiments", "some embodiments", "one embodiment", "an embodiment", a "non-limiting embodiment", or like phrases mean that a particular feature, structure, or characteristic described in connection with the example is included in at least one embodiment. Thus, appearances of the phrases "in various embodiments", "in some embodiments", "in one embodiment", "in an embodiment", "in a non-limiting embodiment", or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

As used herein, "intermediate" means that the referenced element is disposed between two other elements but is not necessarily in contact with those other elements. Accordingly, unless stated otherwise herein, an element that is "intermediate" a first element and a second element may or may not be adjacent to or in contact with the first and/or second elements and additional elements may be disposed between the intermediate element and the first and/or second elements.

Structural fasteners, such as, for example, a lockbolt can be installed into a bore of a structure by deforming (e.g., swaging) a collar of the lockbolt onto a section of the pin of the fastener with an installation tool. Depending on the user and/or installation tool, for example, during installation of such a fastener the collar may not be deformed at all or may not be deformed to a degree necessary to properly install the fastener in place. To address this possibility, the present disclosure provides multi-piece fasteners and methods of fastening enabling one to efficiently visually verify that a structural fastener has been adequately installed during the installation procedure. The multi-piece fasteners and methods described herein can increase accuracy and/or the overall efficiency of manufacturing processes because adequate installation of fasteners can be quickly visually verified.

Figure 2:
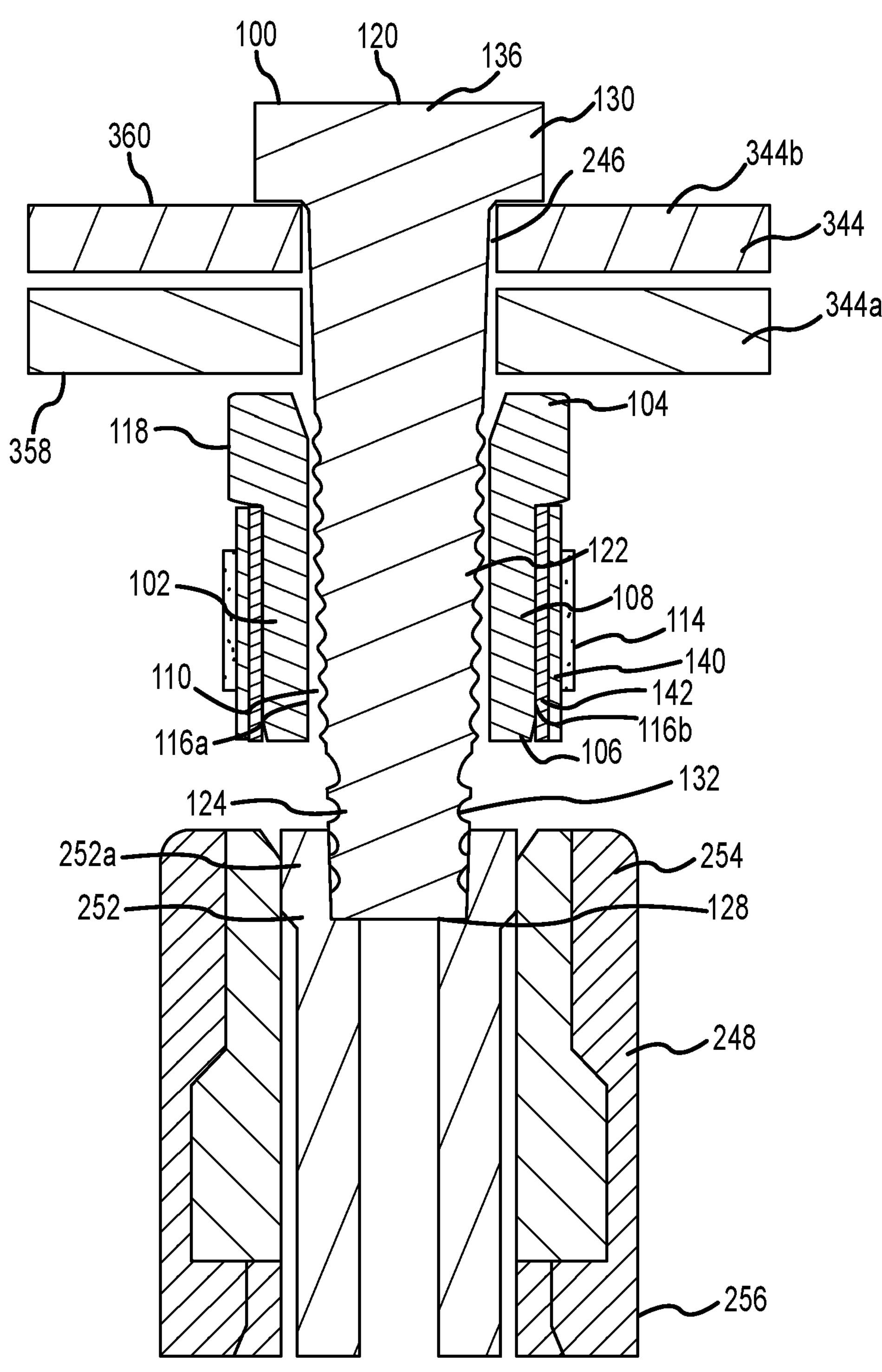
FIG. 2 is a cross-sectional side view of a non-limiting embodiment of a multi-piece fastener according to the present disclosure and an installation apparatus, wherein the multi-piece fastener is shown in a bore in a structure and in a first configuration.
Figure 3:
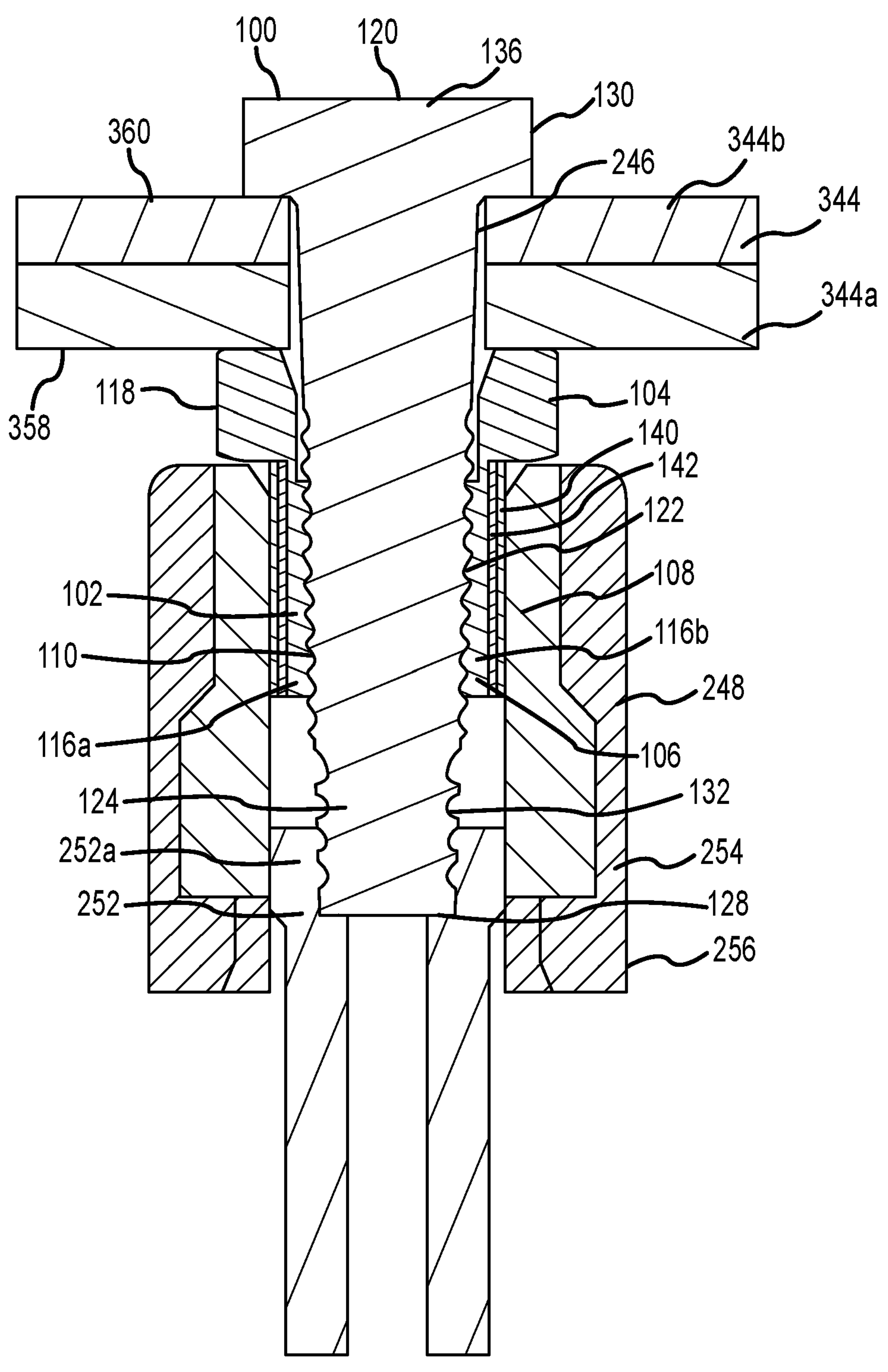
FIG. 3 is a cross-sectional side view of the multi-piece fastener and the installation apparatus of FIG. 2, wherein the multi-piece fastener is shown in a bore in a structure and in a second configuration.

FIG. 1 illustrates a non-limiting embodiment of a multi-piece fastener 100 according to the present disclosure. The multi-piece fastener 100 can be configured to be installed in a bore in a structure (e.g., as illustrated in FIGS. 2-3, discussed below). The multi-piece fastener 100 can comprise at least two components, such as, for example, a fastening collar 102 and a pin 120, as illustrated in FIG. 1, or in some non-limiting embodiments, at least three components (not shown). In various non-limiting embodiments, the multi-piece fastener 100 can comprise a two-piece assembly including the fastening collar 102 and the pin 120. In various non-limiting embodiments, the multi-piece fastener 100 can be at least one of a lockbolt and a blind fastener. For example, the lockbolt can be a structural lockbolt fastener, such as, for example, a structural rivet, a structural bolt, or a structural stud.

The fastening collar 102 can comprise a first collar end 104, a second collar end 106, an elongate portion 108 disposed intermediate the first collar end 104 and the second collar end 106, an inner collar surface **116*a*, and an outer collar surface 116*b*. The inner collar surface 116*a* defines a cavity 110 extending through the elongate portion 108 from the first collar end 104 to the second collar end 106. The elongate portion 108 can define a longitudinal axis of the fastening collar 102. The inner collar surface 116*a* can be adjacent to the cavity 110 and can comprise at least one of a substantially cylindrical region, a threaded region, an annular shoulder, and a groove, depending on the desired application. In various non-limiting embodiments, the fastening collar 102** can be generally cylindrical.

In various non-limiting embodiments, the fastening collar 102 can comprise a flange 118. In certain non-limiting embodiments, the fastening collar 102 can be configured to engage and/or be received by an anvil of an installation tool, while the flange diameter of the flange 118 can inhibit the fastening collar 102 from passing into a bore in a structure beyond a predetermined distance.

The pin 120 can comprise a first pin end 128, a second pin end 130, and a shank 122. The shank 122 can comprise a shape suitable to be received by the cavity 110 of the fastening collar 102, such as, for example, a generally cylindrical shape. The shank 122 can extend intermediate the first pin end 128 and the second pin end 130 and can be dimensioned so as to be disposed at least partially through the cavity 110. When the shank 122 is inserted in the cavity 110, the first pin end 128 can be disposed adjacent to the second collar end 106, and the second pin end 130 can be disposed adjacent to the first collar end 104. In various non-limiting embodiments, the pin 120 can comprise a head portion 136 configured to inhibit the pin 120 from passing into a bore in a structure beyond a predetermined distance. In various other non-limiting embodiments, the pin 120 may not comprise a head portion (not shown).

In various embodiments, the first pin end 128 can comprise a pull region 124 configured to be engaged by an installation tool (e.g., installation tool 248 as shown in FIGS. 2-3). The pull region 124 can comprise at least one of a generally smooth region, an annular shoulder, a groove, and a bore and/or can comprise one or more additional features configured to be engaged by an installation tool. For example, in certain non-limiting embodiments the pull region 124 can comprise grooves 132 that can be engaged by an installation tool.

In various embodiments, the shank 122 can define the longitudinal axis of the pin 120. The shank 122 can be configured to engage the fastening collar 102 in order to secure the shank 122 to the fastening collar 102. Upon engagement, the longitudinal axis of the pin 120 and the longitudinal axis of the fastening collar 102 can be substantially aligned along a longitudinal axis, $A_1$, of the multi-piece fastener 100.

The cavity 110 of the fastening collar 102 can be configured to at least partially receive the shank 122 of the pin 120 therein. For example, the cavity 110 can comprise a shape suitable to receive the shank 122 of the pin 120, such as, for example, a generally cylindrical shape. During and/or after introduction of the shank 122 into the cavity 110, the elongate portion 108, including at least a portion of the inner collar surface 116*a*, can be at least partially deformed onto the shank 122 responsive to forcible contact between the outer collar surface 116*b* of the elongate portion 108 and an installation tool, for example, as described below with respect to FIGS. 2-3. The deformation of the elongate portion 108 can secure the fastening collar 102 to the shank 122. In various non-limiting embodiments, the pin 120 can comprise a breakneck groove (not shown) or other feature configured to fracture upon installation of the multi-piece fastener 100, and the pull region 124 may detach after installation. In various non-limiting embodiments, a diameter of the shank 122 is in a range of 0.06 inch to 4 inches. The shank 122 can comprise at least one of a generally smooth region, an annular shoulder, a groove, and a thread, which can engage the inner surface 116*a* of the fastening collar 102.

The multi-piece fastener 100 comprises a coating 114 on the outer collar surface 116*b*. The coating 114 comprises a film-forming resin and a metal pigment. One embodiment of a "film-forming resin", as used herein, is a resin that forms a self-supporting continuous film upon removal of any diluents or carriers during physical drying and/or curing at ambient or elevated temperature. Various embodiments of a "film-forming resin", as used herein, include resins that are self-crosslinking, resins that are crosslinked by reaction with a crosslinker, resins forming a solid film by solvent evaporation, mixtures of one or more thereof, or the like. As used herein, in certain embodiments "film-forming resin" can refer collectively to both a resin and crosslinker therefor.

In certain embodiments, the film-forming resin can comprise a thermosetting film-forming resin and/or a thermoplastic film-forming resin. As used herein, the term "thermosetting" refers to resins that "set" irreversibly upon curing or crosslinking, wherein the polymer chains of the polymeric components are joined together by covalent bonds, which are often induced to form, for example, by heat or radiation. In various non-limiting embodiments, a curing or crosslinking reaction can be carried out under ambient conditions. Various embodiments of thermosetting coating compositions may include a crosslinking agent that may be selected from, for example, aminoplasts, polyisocyanates (including blocked isocyanates), polyepoxides, beta-hydroxyalkylamides, polyacids, anhydrides, organometallic acid-functional materials, polyamines, polyamides, and mixtures of any of the foregoing. Once cured or crosslinked, a thermosetting film-forming resin may not melt upon the application of heat and can be insoluble in conventional solvents. As used herein, the term "thermoplastic" refers to resins that include polymeric components that are not joined by covalent bonds, can undergo liquid flow upon heating, and are soluble in certain conventional solvents.

A film-forming resin may include functional groups that are reactive with the crosslinking agent. The film-forming resin in the coatings described herein may be selected from any of a variety of polymers known in the art including, for example and without limitation, acrylic polymers, epoxy, polyester polymers, polyurethane polymers, polyamide polymers, polyether polymers, polysiloxane polymers, copolymers of one or more thereof, and mixtures of one or more thereof. Functional groups on the film-forming resin may be selected from any of a variety of reactive functional groups including, for example and without limitation, carboxylic acid groups, amine groups, epoxide groups, hydroxyl groups, thiol groups, carbamate groups, amide groups, urea groups, isocyanate groups (including blocked isocyanate groups), mercaptan groups, or combinations of one or more thereof.

The metal pigment included in the coating 114 can comprise one or more metals and/or metal alloys. The metal pigment can increase the opacity of the coating 114 and/or not increase a coefficient of friction of the outer collar surface 116*b* on which the coating 114 is disposed. Further, the metal pigment can decrease a coefficient of friction of the outer collar surface 116*b*. The coating 114 can have an opacity of at least 25%, such as, for example at least 30%, at least 40% at least 50%, at least 75%, at least 90%, at least 95%, or at least 99%. The opacity of the coating can increase the ease with which the coating 114 can be viewed on the outer collar surface 116*b* by an operator and/or machine.

The lightness value of a coating can be measured and quantified at various angles and reported using the CIELAB L* values of a coating system, film, and/or article using the International Commission on Illumination (CIE) L* value as discussed here. CIE L*a*b* (CIELAB) color values can be measured using a integrating sphere spectrophotometer with D65 illumination and 10° observer. For example, a CIELAB L* value of at least a region of the outer collar surface 116*b* of the fastening collar 102 can be no greater than 10, as measured with an integrating sphere spectrophotometer with D65 Illumination, 10° observer, and specular component excluded, such as, for example, no greater than 7, no greater than 5, or no greater than 4, all measured with an integrating sphere spectrophotometer with D65 Illumination, 10° observer, and specular component excluded.

In various non-limiting embodiments, the coating 114 comprises aluminum, an aluminum alloy, or a combination thereof. For example, the coating 114 can comprise aluminum in a range of 0.1% by weight to 30% by weight based on the total weight of the coating 114, such as, for example, 1% by weight to 20% by weight, 1% by weight to 15% by weight, or 2% by weight to 15% by weight, all based on the total weight of the coating 114.

In order to reduce the coefficient of friction of the outer collar surface 116*b*, the coating may not contain pigments or other components which increase the coefficient of friction. For example, the coating 114 can comprise no greater than 0.01% by weight metal oxide based on total weight of the coating 114. In various non-limiting embodiments, the coating 114 can comprise no greater than 0.01% by weight titanium dioxide based on total weight of the coating 114.

The coating 114 can comprise various other components and/or additives. For example, in certain embodiments the coating 114 can comprise at least one of a fluorescent dye and a fluorescent pigment. For example, the florescent dye can comprise an ultraviolet (UV) fluorescent dye. In various non-limiting embodiments, the coating 114 can be easily seen by exciting the fluorescent dye and/or fluorescent pigment with a corresponding light source (e.g., a UV light source for a UV fluorescent dye). Therefore, the coating 114 may be visible under ambient light and/or when excited by a suitable light source thereby making indication of installation of the multi-piece fastener 100 visible in various lighting conditions.

The coating 114 can be formed from a coating composition that is applied to the fastening collar 102 by, for example, at least one of brushing, spray coating, spin coating, dip coating, roll coating, flow coating, and film coating. In various non-limiting embodiments, the coating 114 can be a solvent-borne coating or a waterborne coating. In certain embodiments, the coating composition can be applied to the fastening collar 102 to achieve various predetermined shapes of the region covered by the coating 114. In various embodiments, the coating composition can be applied to the fastening collar 102 and thereafter cured and/or physically dried (e.g., removal of any diluents or carriers).

As used in this specification, the terms "cured" and "curing" refer to the chemical crosslinking of components in a coating composition applied as a coating layer over a substrate. Accordingly, the terms "cured" and "curing" do not encompass solely physical drying of coating compositions through solvent or carrier evaporation. In this regard, the term "cured," as used in this specification, refers to the condition of a coating layer in which a component of the coating composition forming the layer has chemically reacted to form new covalent bonds in the coating layer (e.g., new covalent bonds formed between a binder resin and a curing agent).

The coating 114 can cover at least a portion of the fastening collar 102 and, in some non-limiting embodiments, the coating 114 covers the entire outer surface **116*b* of the fastening collar 102. In various non-limiting embodiments, the coating 114 is not present on the flange 118. In certain non-limiting embodiments, the coating 114 is in the shape of a strip, as illustrated in the non-limiting example shown in FIG. 1**.

The multi-piece fastener 100 can comprise a lubrication layer 140 intermediate the outer collar surface **116*b* and the coating 114. The lubrication layer 140 can cover at least a portion of the fastening collar 102 and, in some non-limiting embodiments, the lubrication layer 140 covers the entire outer surface 116*b* of the fastening collar 102. The lubrication layer 140 can reduce the coefficient of friction on the outer collar surface 116*b* and facilitate movement of an anvil 254 while in forcible contact with the outer collar surface 116*b*. The lubrication layer 140 can inhibit formation of a bond between the coating 114 and the fastening collar 102, such that the coating 114 can be at least partially removed during installation of the multi-piece fastener 100. The lubrication layer 140 can comprise a wax, tungsten disulfide, or other compound suitable to reduce the coefficient of friction on the outer collar surface 116*b***.

In various non-limiting embodiments, the multi-piece fastener 100 can comprise a corrosion resistant layer 142 intermediate the outer collar surface **116*b* and the coating 114. The corrosion resistant layer 142 can cover at least a portion of the fastening collar 102 and, in some non-limiting embodiments, the lubrication layer 140 covers the entire outer surface 116*b* of the fastening collar 102. The corrosion resistant layer 142 can be suitable to enhance the corrosion resistance of the multi-piece fastener. For example, the corrosion resistant layer 142** can comprise a zinc electroplate layer, a chemical coating layer (e.g., GEOMET® water based chemical coating available from NOF Metal Coatings North America, Chardon, OH, USA), and/or other layer suitable to inhibit corrosion.

The fastening collar 102 is configured to be deformed onto the shank 122 by forcibly contacting the outer collar surface **116*b* of the fastening collar 102. Forcibly contacting the outer collar surface 116*b* at least partially removes the coating 114 on the outer collar surface 116*b* and indicates successful installation of the multi-piece fastener 100. For example, an operator and/or a machine can observe a change in the amount of coating 114 on the outer collar surface 116*b* after installation compared to the coating 114 on the outer collar surface 116*b* prior to installation. In various non-limiting embodiments, when the coating 114 is in the shape of a strip, the coating 114 may be substantially or completely removed during installation of the multi-piece fastener 100, thereby indicating that the multi-piece fastener 100** has been properly installed.

A multi-piece fastening system according to the present disclosure can comprise at least one of a metal, a metal alloy, a composite material, and another suitable material. For example, in various embodiments, the multi-piece fastener according to the present disclosure (e.g., multi-piece fastener 100) can comprise at least one of aluminum, an aluminum alloy, titanium, a titanium alloy, nickel, a nickel alloy, iron, an iron alloy, and a carbon fiber composite material.

As illustrated in FIGS. 2-3, the multi-piece fastener 100 can be installed into a bore 246 in a structure 344. As illustrated, the bore 246 can extend through the structure 344 from a first side 358 to a second side 360. In various other non-limiting embodiments, the bore 246 may extend from the first side 268 but not through the entire structure 344, such that a blind hole is formed and a multi-piece fastener according to the present disclosure configured as a blind fastener may be used. In various embodiments, the bore 246 may comprise threads, while in other non-limiting embodiments the bore 246 does not comprise threads.

The structure 344 can comprise, for example, at least one of a metal, a metal alloy, a polymer, wood, concrete, a composite material, or another suitable material. For example, in certain embodiments, the structure 344 can comprise at least one of aluminum, an aluminum alloy, titanium, a titanium alloy, nickel, a nickel alloy, iron, an iron alloy, and a carbon fiber composite material. In various embodiments, the structure 344 into which the multi-piece fastening system 100 is assembled comprises aluminum and/or an aluminum alloy, such as, for example, 7075 aluminum alloy. With reference to the accompanying figures, in various non-limiting embodiments the structure 344 can be configured as at least one of an aerospace component or structure, an automotive component or structure, a transportation component or structure, a building and construction component or structure, or another component or structure.

The structure 344 can comprise a single layer of material or at least two (i.e., two or more) layers of material. For example, as illustrated in FIGS. 2-3, the structure 344 can comprise a first material layer **344*a* and a second material layer 344***b*. The first material layer 344*a* can be intermediate the second material layer 344*b* and the fastening collar 102 when the fastening collar 202 is installed. In various non-limiting embodiments, the first material layer 344*a* is adjacent to the fastening collar 102.

To facilitate alignment of the multi-piece fastener 100 and the bore 246, a size and/or shape of the first pin end 128 can be configured to readily enter into and move through the bore 246. In various embodiments, a diameter of the head portion 136 can be greater than a diameter of the bore 246 in order to inhibit the pin 120 from further advancing into the bore 246. In various non-limiting embodiments lacking a head portion 136, a diameter of the second pin end 130 can be sized and configured to be less than a diameter of the bore 246, thereby allowing the second pin end 130 to readily move into and through the bore 246.

As illustrated in FIG. 2, the first pin end 128 of the pin 120 was positioned in alignment with the second side 360 of the bore 246 before being inserted through the bore 246. In various other non-limiting embodiments in which the multi-piece fastener 100 is configured as a blind fastener without a head portion 136, the second pin end 130 of the pin 120 can be positioned in alignment with the first side 268 of the bore 246 and inserted through the bore 246.

Again referring to FIG. 2, the fastening collar 102 is shown positioned over the first pin end 128, and the first pin end 128 has been inserted into and through the cavity 110 of the fastening collar 102. The first collar end 104 of the fastening collar 102 has been contacted with the first layer 344*a* of the structure 344. In various non-limiting embodiments in which the pin 120 and the fastening collar 102 comprise threads, inserting the first pin end 128 into the cavity 110 of the fastening collar 102 may require rotation of at least one of the fastening collar 102 and the pin 120.

The fastening collar 102 can be in forcible contact with the structure 344. The forcible contact between the fastening collar 102 and the structure 344 can limit further axial movement of the fastening collar 102 relative to the pin 120 along the longitudinal axis of the multi-piece fastener 100.

Referring again to FIG. 2, a multi-piece fastener installation apparatus 248 is shown. The installation apparatus 248 comprises a housing 256, the anvil 254 positioned within the housing 256, and a collet 252 positioned within the housing 256. The anvil 254 can be configured to selectively forcibly contact at least a portion of the fastening collar 102 of the multi-piece fastener 100. The collet 252 comprises a first collet end 252*a* adjacent to the anvil 254, and the first collet end 252*a* comprises jaws configured to forcibly contact at least a portion of the pull region 124 of the shank 122 of the multi-piece fastener 100.

Referring again to FIG. 2, the collet 252 of the installation tool 248 has engaged the shank 122 of the pin 120 of the multi-piece fastener 100. The collet 252 can be configured to retract within the installation tool 248, which causes the collet 252 to forcibly contact an anvil 254 of the installation tool 248. Thereafter, the collet 252 can close around and forcibly contact the pull region 124 of pin 120, thereby engaging the pull region 124. Upon engagement, the collet 252 can apply an axial force to the pull region 124 of the pin 120, which can decrease a gap, if present, between the first layer 344*a* and the second layer 344*b* of the structure 344, resulting in forcible contact between the fastening collar 102 and the structure 344.

The anvil 254 can at least partially deform the fastening collar 102 onto the shank 122 of the pin 120, thereby securing the fastening collar 102 to the shank 122. The coating 114 is at least partially removed from the fastening collar 102 as the anvil 254 deforms the fastening collar 102. For example, referring to FIG. 3, the collet 252 can retract within the installation tool 248 and move the pin 120 as the collet 252 retracts due to the contact between the pull region 124 and the collet 252. As the collet 252 retracts, the anvil 254 forcibly contacts the fastening collar 102, including the outer collar surface 116*b* and the coating 114. After a predetermined force is achieved, the elongate portion 108 can be at least partially deformed and the coating 114 can be at least partially removed from the outer collar surface 116*b* as a result of the forcible contact between the anvil 254 and the fastening collar 102. For example, the elongate portion 108 can be at least partially swaged onto at least a portion of the shank 122. The at least partial removal of the coating 114 can be a visual indication to an operator and/or a machine that can indicate the multi-piece fastener 100 has been properly installed. In various non-limiting embodiments, because the coating 114 includes metal pigment, the force applied by the installation apparatus 248 to deform the elongate portion 108 can be reduced compared to a force applied by the installation apparatus 248 to a comparative fastening collar without the coating 114. For example, the metal pigment can act as a lubricant thereby reducing the coefficient of friction on the outer collar surface 116*b* and facilitating movement of the anvil 254 while in forcible contact with the outer collar surface 116*b*.

As illustrated in FIG. 3, after installation of the multi-piece fastener 100 into the structure 344, the fastening collar 102 and the head portion 136 of the pin 120 can apply a clamping force to the structure 344, thereby securing the two-piece fastener 100 to at least a portion of the structure 344. In that way, for example, the first material layer 344*a* and the second material layer 344*b* of the structure 344 are secured together. The coating 114 has been removed from the outer collar surface 116*b* in FIG. 3, visually indicating (after the installation tool 248 is removed) proper installation of the multi-piece fastener 100

In various non-limiting embodiments, the installation tool can be a puller tool or a squeezer tool. For example, as is known in the art, a squeezer tool can simultaneously apply a compressive force to the fastening collar 102 and the second pin end 130 of the pin 120. The compressive force can deform the fastening collar 102 onto the shank 122 of the pin 120, thereby securing the fastening collar 102 onto the shank 122.

Figure 4:
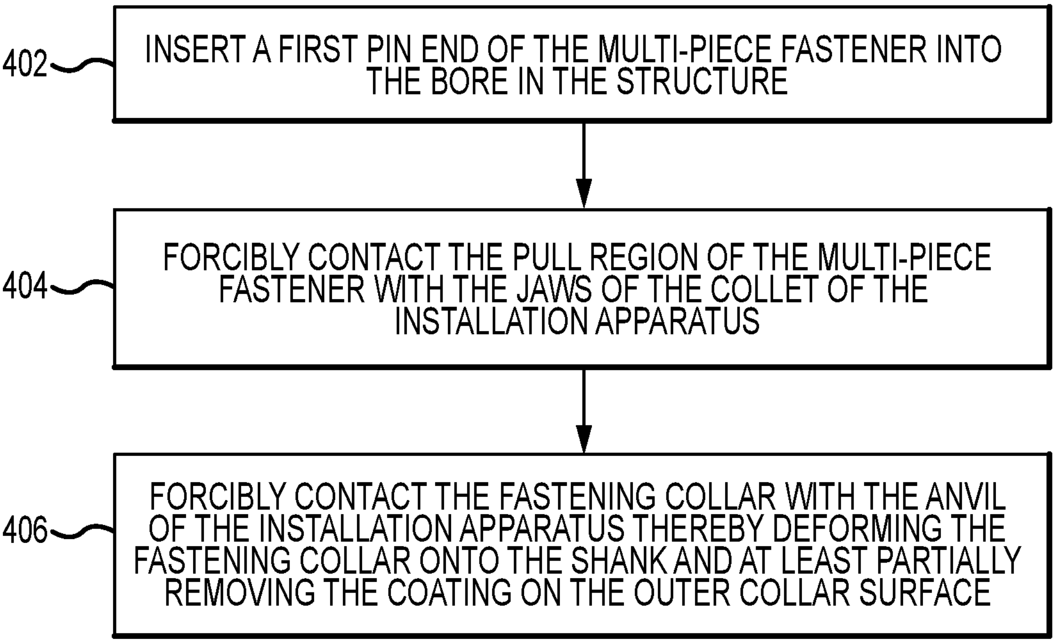
FIG. 4 is a flow chart of a non-limiting embodiment of a method for fastening according to the present disclosure.

Referring to FIG. 4, in various non-limiting embodiments, a method for fastening a structure can be used to install a multi-piece fastener according to the present. At step 402, a first pin end 128 of the multi-piece fastener 100 is inserted into the bore 246 in the structure 344. At step 604, the pull region 124 of the pin 120 of the multi-piece fastener 100 can be forcibly contacted with the jaws of a collet 252 of an installation apparatus 248. At step 406, the outer collar surface 116*b* of the fastening collar 102 is forcibly contacted with the anvil 254 of the installation apparatus 248, and the pull region 124 is moved distal from the fastening collar 102 utilizing the collet 252 of the fastening collar installation apparatus 248. This deforms the fastening collar 102 onto the shank 122 of the pin 102 and at least partially removes the coating 114 on the outer collar surface 116*b*, thereby indicating proper installation of the multi-piece fastener 100. In various non-limiting embodiments, at step 406 during installation of the multi-piece fastener 100 at least 90% of the total visible surface area of the coating 114 originally present on the outer collar surface 116*b* has been removed, such as, for example, at least 95% or at least 99% of the total visible surface area of the coating 114 originally present on the outer collar surface 116*b*, thereby visually indicating proper installation. The visible surface area means the surface area of the coating 114 that is viewable by an operator during installation of the multi-piece fastener 100.

Various aspects of non-limiting embodiments of inventions according to the present disclosure include, but are not limited to, the aspects listed in the following numbered clauses.

Clause 1. A multi-piece fastener comprising:
a fastening collar comprising
an inner collar surface defining a collar cavity,
an outer collar surface,
a coating on the outer collar surface, the coating comprising a film-forming resin and a metal pigment, and
a lubrication layer intermediate the coating and the outer collar surface; and
a pin configured to be at least partially received by the collar cavity, the pin comprising
a first pin end,
a second pin end, and
a shank extending intermediate the first pin end and the second pin end;
wherein the fastening collar is configured to be deformed onto the shank by forcibly contacting the outer collar surface of the fastening collar, and wherein forcibly contacting the outer collar surface at least partially removes the coating on the outer collar surface and indicates installation of the multi-piece fastener.

Clause 2. The multi-piece fastener of clause 1, wherein the metal pigment comprises aluminum, an aluminum alloy, or a combination thereof.

Clause 3. The multi-piece fastener of any of clauses 1-2, wherein the coating comprises no greater than 0.01% by weight titanium dioxide based on total weight of the coating.

Clause 4. The multi-piece fastener of any of clauses 1-3, wherein the coating comprises no greater than 0.01% by weight metal oxide based on total weight of the coating.

Clause 5. The multi-piece fastener of any of clauses 1-4, wherein the coating further comprises at least one of a fluorescent dye and a fluorescent pigment.

Clause 6. The multi-piece fastener of any of clauses 1-5, wherein a CIELAB L* value of at least a region of the outer collar surface of the fastening collar is no greater than 10, as measured with an integrating sphere spectrophotometer with D65 Illumination, 10° observer, and specular component excluded.

Clause 7. The multi-piece fastener of any of clauses 1-6, further comprising a corrosion resistant layer intermediate the coating and the outer collar surface Clause 8. The multi-piece fastener of any of clauses 1-7, wherein the fastening collar further comprises a flange and the coating is not present on the flange.

Clause 9. The multi-piece fastener of any of clauses 1-8, wherein the coating is in the shape of a strip.

Clause 10. The multi-piece fastener of any of clauses 1-9, wherein the coating has an opacity of at least 25%.

Clause 11. The multi-piece fastener of any of clauses 1-10, wherein the coating does not increase a coefficient of friction of the outer collar surface of the fastening collar.

Clause 12. The multi-piece fastener of any of clauses 1-11, wherein the shank comprises at least one of a generally smooth region, an annular shoulder, a groove, and a threaded region.

Clause 13. The multi-piece fastener of any of clauses 1-12, wherein the multi-piece fastener is configured to be installed in a bore in a structure and wherein the structure is at least one of an aerospace part or component, an automotive part or component, a transportation part or component, and a building and construction part or component.

Clause 14. The multi-piece fastener of any of clauses 1-13, wherein a diameter of the shank is in a range of 0.06 inch to 4 inches.

Clause 15. The multi-piece fastener of any of clauses 1-14, wherein the multi-piece fastener comprises at least one of a metal and a metal alloy.

Clause 16. A lockbolt comprising the multi-piece fastener of any of clauses 1-15.

Clause 17. A method for fastening, the method comprising:
inserting a first pin end of a multi-piece fastener into a bore in a structure, the multi-piece fastener comprising
a fastening collar comprising
an inner collar surface defining a collar cavity,
an outer collar surface,
a coating on the outer collar surface, the coating comprising a film-forming resin and a metal pigment, and
a lubrication layer intermediate the coating and the outer collar surface,
a pin configured to be at least partially received by the collar cavity, the pin comprising
a first pin end,
a second pin end, and
a shank extending intermediate the first pin end and the second pin end;
inserting the pin at least partially into the collar cavity; and
forcibly contacting the outer collar surface of the fastening collar with an anvil of a fastening collar installation apparatus and thereby deforming the fastening collar onto the shank of the pin, wherein forcibly contacting the outer collar surface at least partially removes the coating on the outer collar surface and indicates installation of the multi-piece fastener.

Clause 18. The method of clause 17, wherein the first pin end comprises a pull region and the method further comprises:
forcibly contacting the pull region with jaws of a collet of the fastening collar installation apparatus.

Clause 19. The method of any of clauses 17-18, wherein the metal pigment comprises aluminum.

Clause 20. The method of any of clauses 17-19, wherein forcibly contacting the outer collar surface removes at least 90% of a total visible surface area of the coating from the outer collar surface of the fastening collar.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

One skilled in the art will recognize that the herein described fasteners, structures, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, apparatus, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A multi-piece fastener comprising:
a fastening collar comprising
an inner collar surface defining a collar cavity,
an outer collar surface,
a coating on the outer collar surface, the coating comprising a film-forming resin and a metal pigment, and
a lubrication layer intermediate the coating and the outer collar surface; and
a pin configured to be at least partially received by the collar cavity, the pin comprising
a first pin end,
a second pin end, and
a shank extending intermediate the first pin end and the second pin end;
wherein the fastening collar is configured to be deformed onto the shank by forcibly contacting the outer collar surface of the fastening collar, and wherein forcibly contacting the outer collar surface at least partially removes the coating on the outer collar surface and indicates installation of the multi-piece fastener, and
wherein the coating does not increase a coefficient of friction of the outer collar surface of the fastening collar.

2. The multi-piece fastener of claim 1, wherein the metal pigment comprises aluminum, an aluminum alloy, or a combination thereof.

3. The multi-piece fastener of claim 1, wherein the coating comprises no greater than 0.01% by weight titanium dioxide based on total weight of the coating.

4. The multi-piece fastener of claim 1, wherein the coating comprises no greater than 0.01% by weight metal oxide based on total weight of the coating.

5. The multi-piece fastener of claim 1, wherein the coating further comprises at least one of a fluorescent dye and a fluorescent pigment.

6. The multi-piece fastener of claim 1, wherein a CIELAB L* value of at least a region of the outer collar surface of the fastening collar is no greater than 10.

7. The multi-piece fastener of claim 1, further comprising a corrosion resistant layer intermediate the coating and the outer collar surface.

8. The multi-piece fastener of claim 1, wherein the fastening collar further comprises a flange and the coating is not present on the flange.

9. The multi-piece fastener of claim 1, wherein the coating is in the shape of a strip.

10. The multi-piece fastener of claim 1, wherein the coating has an opacity of at least 25%.

11. The multi-piece fastener of claim 1, wherein the shank comprises at least one of a generally smooth region, an annular shoulder, a groove, and a threaded region.

12. The multi-piece fastener of claim 1, wherein the multi-piece fastener is configured to be installed in a bore in a structure and wherein the structure is at least one of an aerospace part or component, an automotive part or component, a transportation part or component, and a building and construction part or component.

13. The multi-piece fastener of claim 1, wherein a diameter of the shank is in a range of 0.06 inch to 4 inches.

14. The multi-piece fastener of claim 1, wherein the multi-piece fastener comprises at least one of a metal and a metal alloy.

15. A lockbolt comprising the multi-piece fastener of claim 1.

16. A method for fastening, the method comprising:
inserting a first pin end of a multi-piece fastener into a bore in a structure, the multipiece fastener comprising
a fastening collar comprising
an inner collar surface defining a collar cavity,
an outer collar surface,
a coating on the outer collar surface, the coating comprising a film-forming resin and a metal pigment, wherein the coating does not increase a coefficient of friction of the outer collar surface of the fastening collar, and
a lubrication layer intermediate the coating and the outer collar surface, a pin configured to be at least partially received by the collar cavity, the pin comprising
the first pin end,
a second pin end, and
a shank extending intermediate the first pin end and the second pin end;
inserting the pin at least partially into the collar cavity; and
forcibly contacting the outer collar surface of the fastening collar with an anvil of a fastening collar installation apparatus and thereby deforming the fastening collar onto the shank of the pin, wherein forcibly contacting the outer collar surface at least partially removes the coating on the outer collar surface and indicates installation of the multi-piece fastener.

17. The method of claim 16, wherein the first pin end comprises a pull region and the method further comprises:

forcibly contacting the pull region with jaws of a collet of the fastening collar installation apparatus.

18. The method of claim 16, wherein the metal pigment comprises aluminum.

19. The method of claim 16, wherein forcibly contacting the outer collar surface removes at least 90% of a total visible surface area of the coating from the outer collar surface of the fastening collar.

* * * * *